(12) United States Patent
Landis et al.

(10) Patent No.: US 12,213,060 B2
(45) Date of Patent: Jan. 28, 2025

(54) TECHNIQUES FOR IDENTIFYING SYNCHRONIZATION SIGNALS FROM REPEATERS IN WIRELESS COMMUNICATIONS

(71) Applicant: QUALCOMM Incorporated, San Diego, CA (US)

(72) Inventors: Shay Landis, Hod Hasharon (IL); Idan Michael Horn, Hod Hasharon (IL); Yehonatan Dallal, Kfar Saba (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/890,110

(22) Filed: Aug. 17, 2022

(65) Prior Publication Data

US 2024/0064618 A1 Feb. 22, 2024

(51) Int. Cl.
*H04W 48/16* (2009.01)

(52) U.S. Cl.
CPC .................................. *H04W 48/16* (2013.01)

(58) Field of Classification Search
CPC ..................................................... H04W 48/16
See application file for complete search history.

(56) References Cited

U.S. PATENT DOCUMENTS

2016/0373351 A1* 12/2016 Sharma .................. H04L 45/74

* cited by examiner

*Primary Examiner* — Curtis B Odom
(74) *Attorney, Agent, or Firm* — Arent Fox LLP

(57) ABSTRACT

Aspects described herein relate to processing synchronization signal block (SSB) signals and/or corresponding system information block (SIB) based on whether the SSB is received directly from a network node or from a router in a path from the network node. For example, a signal originated from a network node can be received. It can be determined whether the SSB is received from the network node or from a router in a path from the network node, and the SSB or a corresponding system information block (SIB) of the network node can be processed based on whether the SSB is received from the network node or the router. Other aspects relate to indicating whether a SSB is from a network node or a router in the path.

30 Claims, 7 Drawing Sheets

TECHNIQUES FOR IDENTIFYING SYNCHRONIZATION SIGNALS FROM REPEATERS IN WIRELESS COMMUNICATIONS

FIELD OF THE DISCLOSURE

Aspects of the present disclosure relate generally to wireless communication systems, and more particularly, to techniques for transmitting synchronization signals from repeaters in wireless communications.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, repeaters can be used to improve line-of-sight (LOS) channels for certain devices, such as devices within a building that may not have desirable LOS to outdoor base stations. For example, repeaters can include various classes of repeaters (e.g., amplify and forward repeaters), relays, femto cells, reconfigurable intelligent surfaces (RISs), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to receive a synchronization signal block (SSB) originated from a network node, and process the SSB or a corresponding system information block (SIB) of the network node based on whether the SSB is received from the network node or from a router in a path from the network node.

In another aspect, an apparatus for wireless communication is provided that includes a processor, memory coupled with the processor, and instructions stored in the memory. The instructions are operable, when executed by the processor, to cause the apparatus to detect whether there is a router in a path for transmitting a SSB to a UE, and transmit, to the UE, the SSB including a MIB that indicates whether there is the router in the path.

In an aspect, a method for wireless communication at a user equipment (UE) is provided that includes receiving a SSB originated from a network node, and processing the SSB or a corresponding SIB of the network node based on whether the SSB is received from the network node or from a router in a path from the network node.

In another aspect, a method for wireless communications at a network node is provided that includes detecting whether there is a router in a path for transmitting a SSB to a UE, and transmitting, to the UE, the SSB including a master information block (MIB) that indicates whether there is the router in the path.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
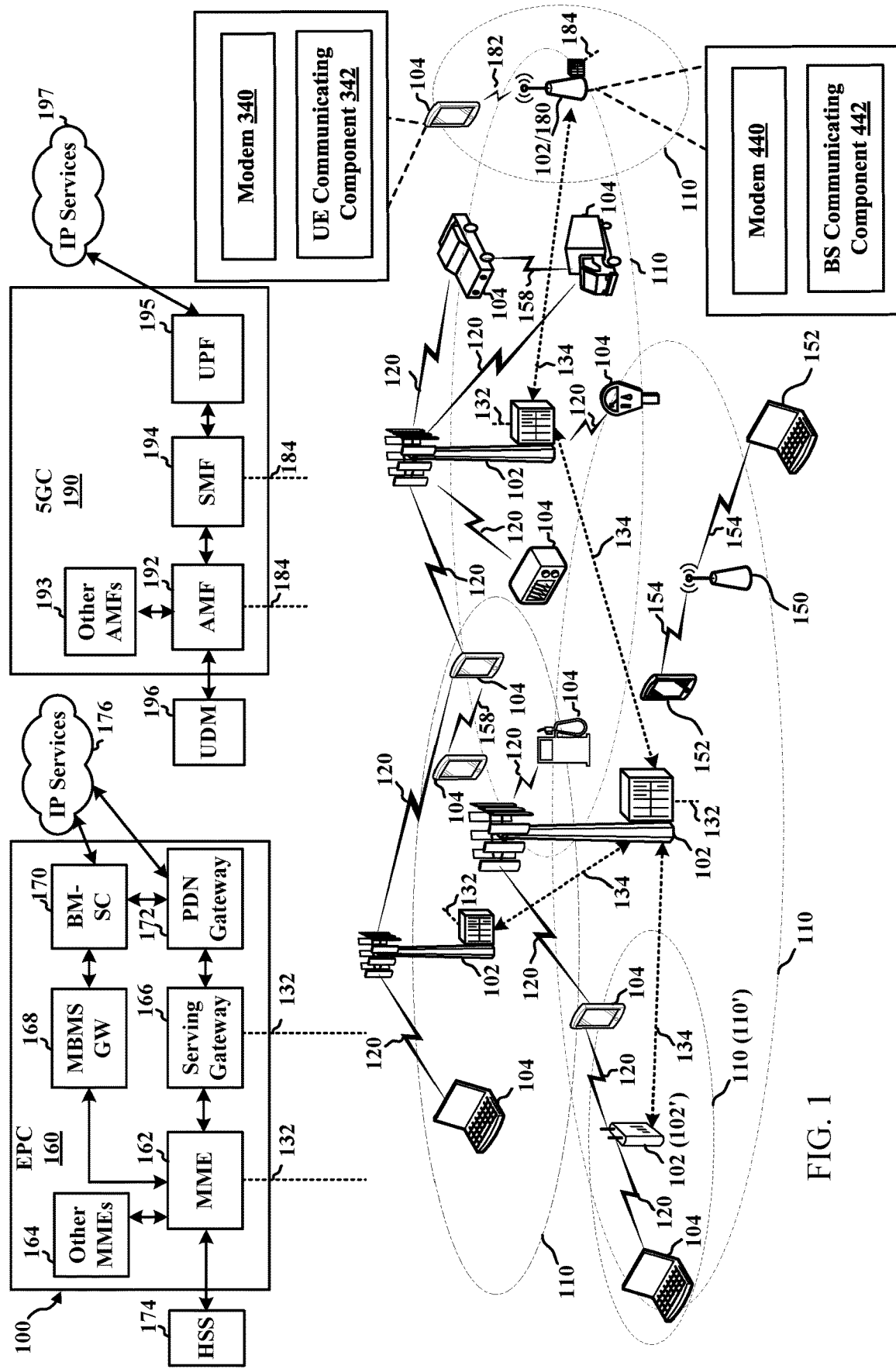
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to identifying synchronization signals as being sent (or received) directly from a network node (e.g., a base station, gNB, etc.) or directly from a router or other device in the path from the network node. For example, the router may include one or more classes of repeater (e.g., an amplify and forward repeater), a relay, a femto cell, a reconfigurable intelligent surface (RIS), etc. For example, in fifth generation (5G) new radio (NR) and sub-terra-hertz (THz) applications, line of sight (LOS) channel can be used (or required) for coverage and high throughputs. In case of indoor or urban model, LOS channel may be hard to find and many deployments may use additional routers—repeaters, relays, femto cells, RISs, etc.—to penetrate a window or to bypass a blocker. The routers can maintain low latency relaying such that the UE channel delay spread does not pass the cyclic prefix (CP) length (which may otherwise cause inter-symbol interference (ISI)), cover a spatial area (such as a room), and/or support communication to multiple devices (e.g., user equipment (UEs)).

One approach for routers in higher bands is to redirect the synchronization signals (e.g., synchronization signal block (SSB) in 5G NR) coming from the network node (e.g., gNB) in different spatial directions to allow detection by UEs in different locations. Currently, the UE may not know whether the SSB is coming directly from a network node (e.g., gNB) or re-routed by a router. In addition, the UE may receive and process both the SSB from the router in the path and the SSB directly transmitted by the network node (e.g., gNB). In an example, the UE may be instructed to prefer direct SSB from gNB to reduce router/repeater load. In any case, for example, the UEs behavior may change depending on whether there is a router in the path of the received SSB. For example, the UE may process a SSB or corresponding system information block (SIB), or portions thereof, differently based on whether the SSB is received directly from the network node or from a router in the path between the UE and network node. As such, aspects described herein facilitate identification of whether synchronization signals are directly transmitted by the network node or are repeated by a router in the path to the network node.

In some aspects described herein, SSB signaling can indicate whether a router is in the reception path. As such, a UE receiving the SSB signaling can have modified functionality when the SSB is received from a router. This can allow the UE to have improved SSB handling when routers are used in higher bands utilizing narrow beams, and may improve overall system performance by the UE being aware of the router in the path both in downlink and/or uplink.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for processing a SSB or a corresponding SIB based on whether the SSB is received directly from a network node or from a router in a path to the network node, in accordance with aspects described herein. In addition, some nodes may have a modem 440 and BS communicating component 442 for indicating whether a SSB is from the network node or is routed by a router in a path to the network node, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, BS communicating component 442 can indicate whether a SSB is being transmitted by a base station 102 or gNB 180 (or portion thereof) direction, or whether there is a router—e.g., repeater, relay, femto cell, RIS, etc.—in the path to the base station 102. In this example, UE communicating component 342 can receive the indication and can receive the SSB. UE communicating component 342 can process the SSB based on the indication, such that processing can be different for when the SSB is received directly from the base station 102 or gNB 180 (or portion thereof) than when received from a router in the path. For example, UE communicating component 342 can refrain from processing certain portions of the SSB or a related SIB where the SSB is received from a router in the path.

Figure 2:
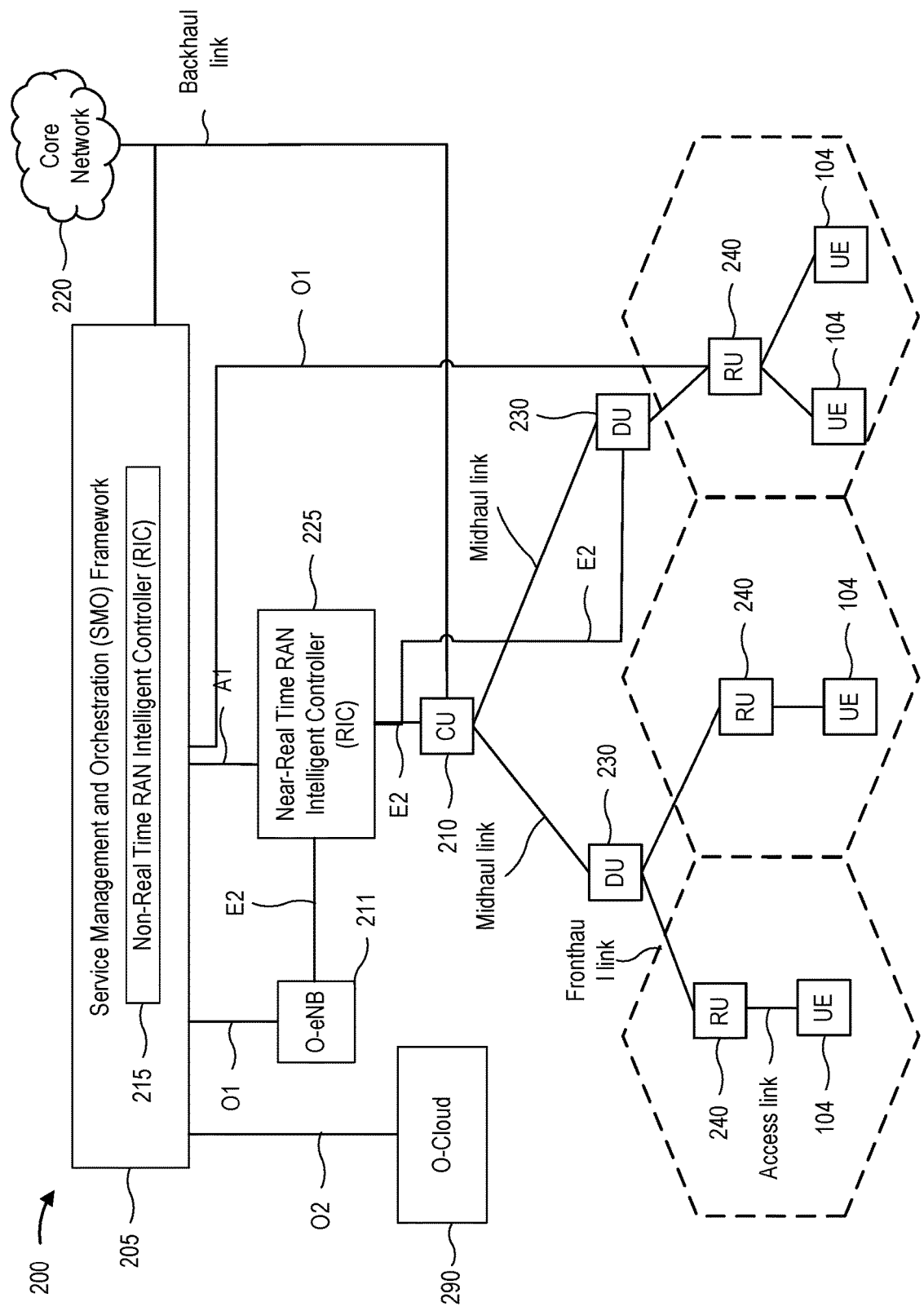
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
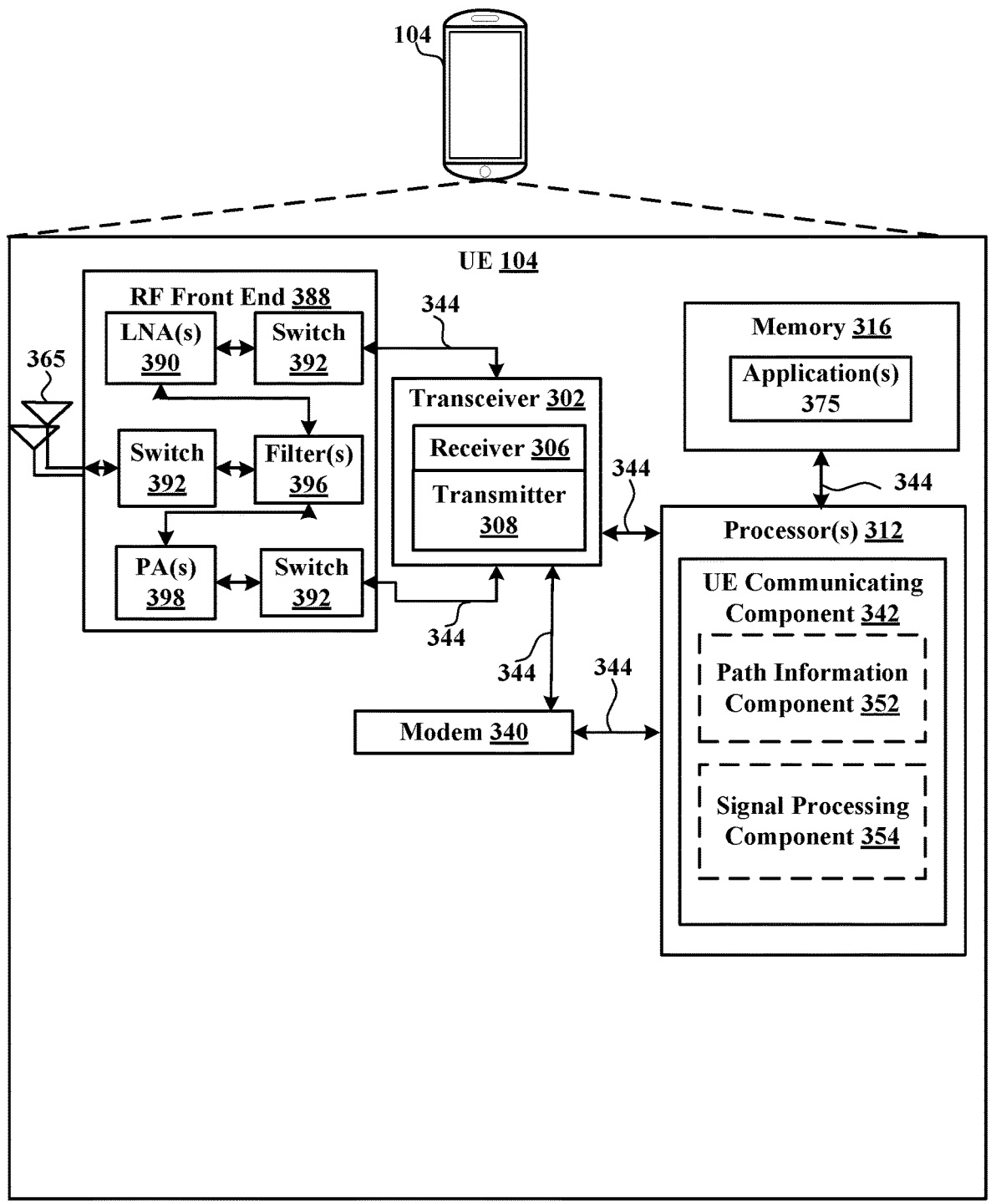
FIG. 3 is a block diagram illustrating an example of a user equipment (UE), in accordance with various aspects of the present disclosure.
Figure 4:
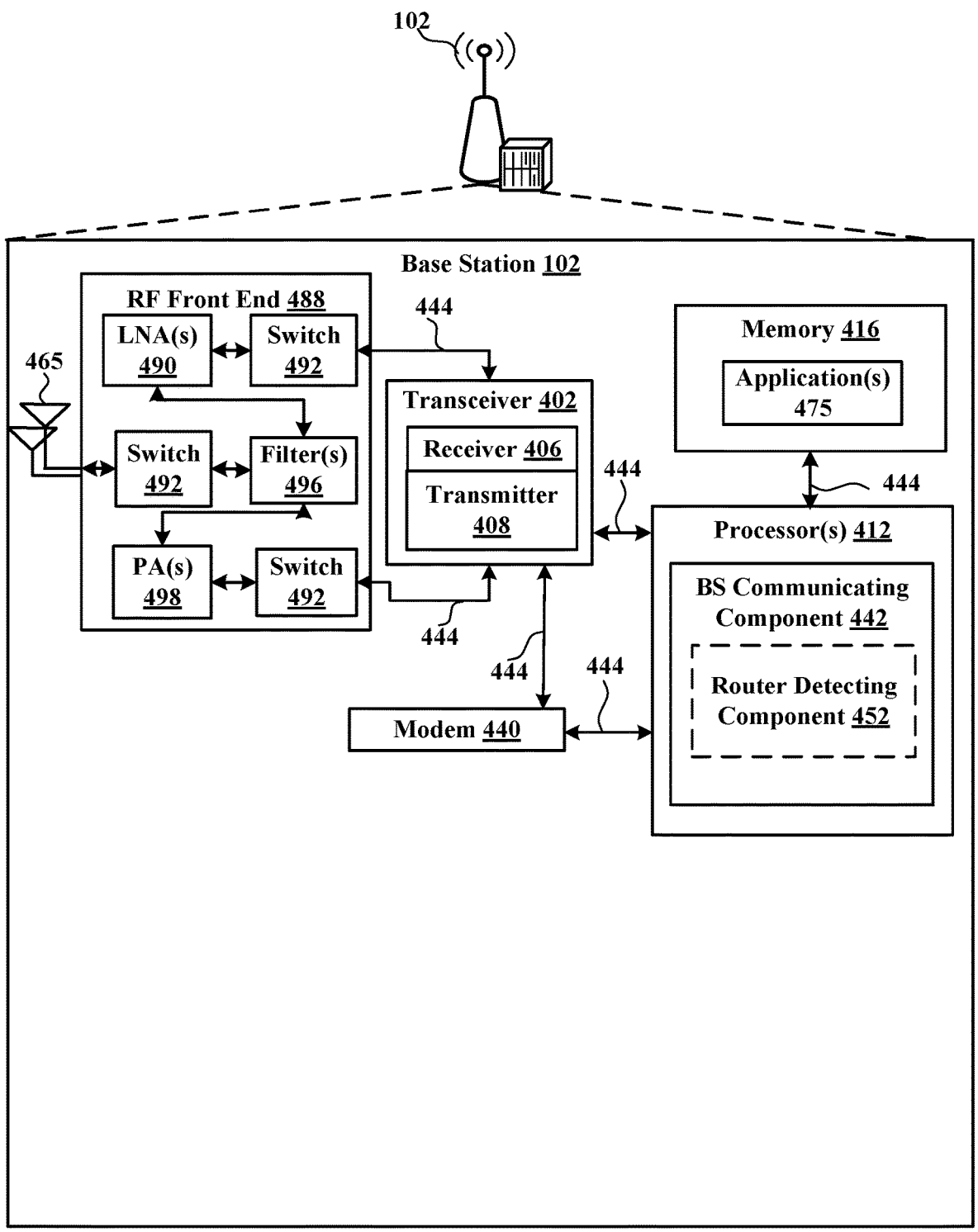
FIG. 4 is a block diagram illustrating an example of a base station, in accordance with various aspects of the present disclosure.
Figure 5:
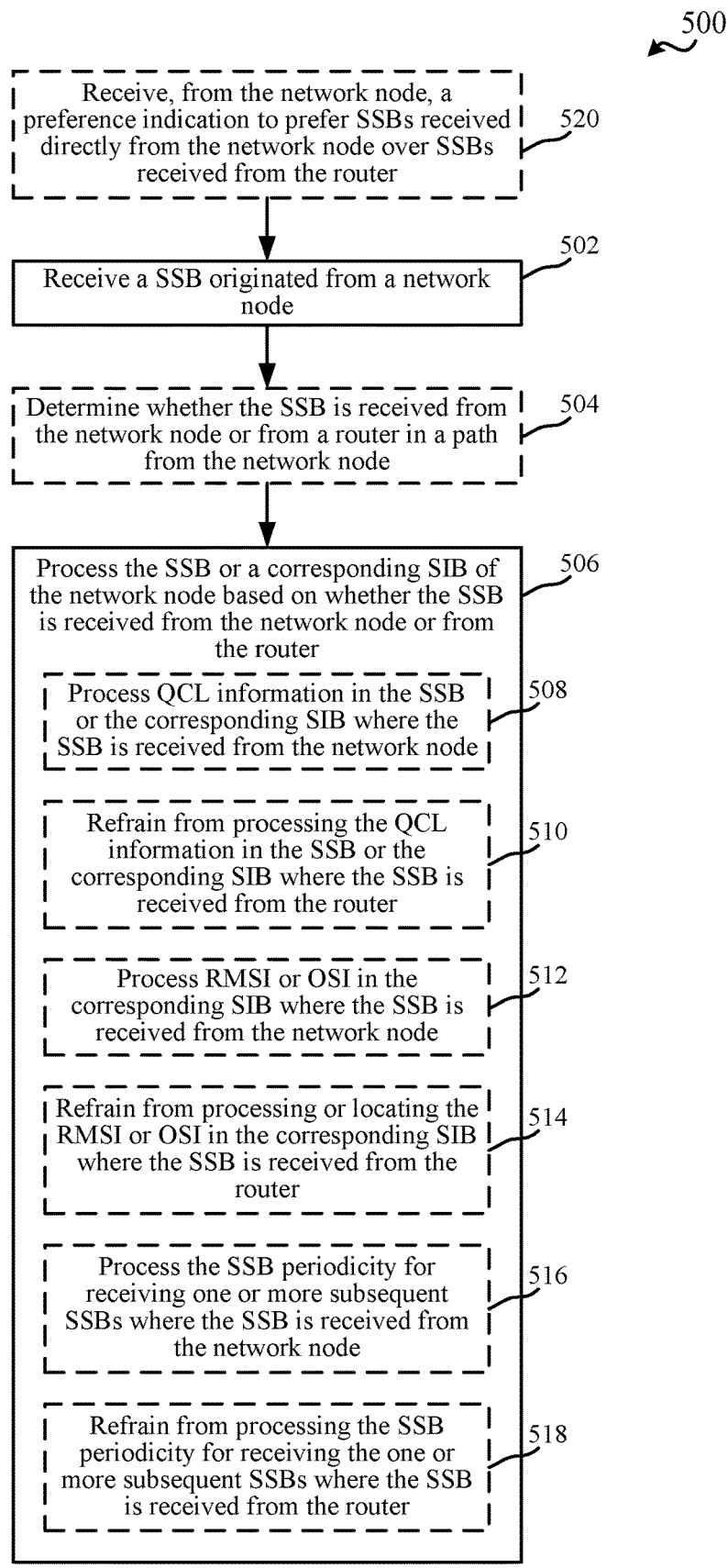
FIG. 5 is a flow chart illustrating an example of a method for processing a synchronization signal block (SSB) or corresponding system information block (SIB) based on whether the SSB is received directly from a network node or from a router in the path to the network node, in accordance with aspects described herein.
Figure 6:
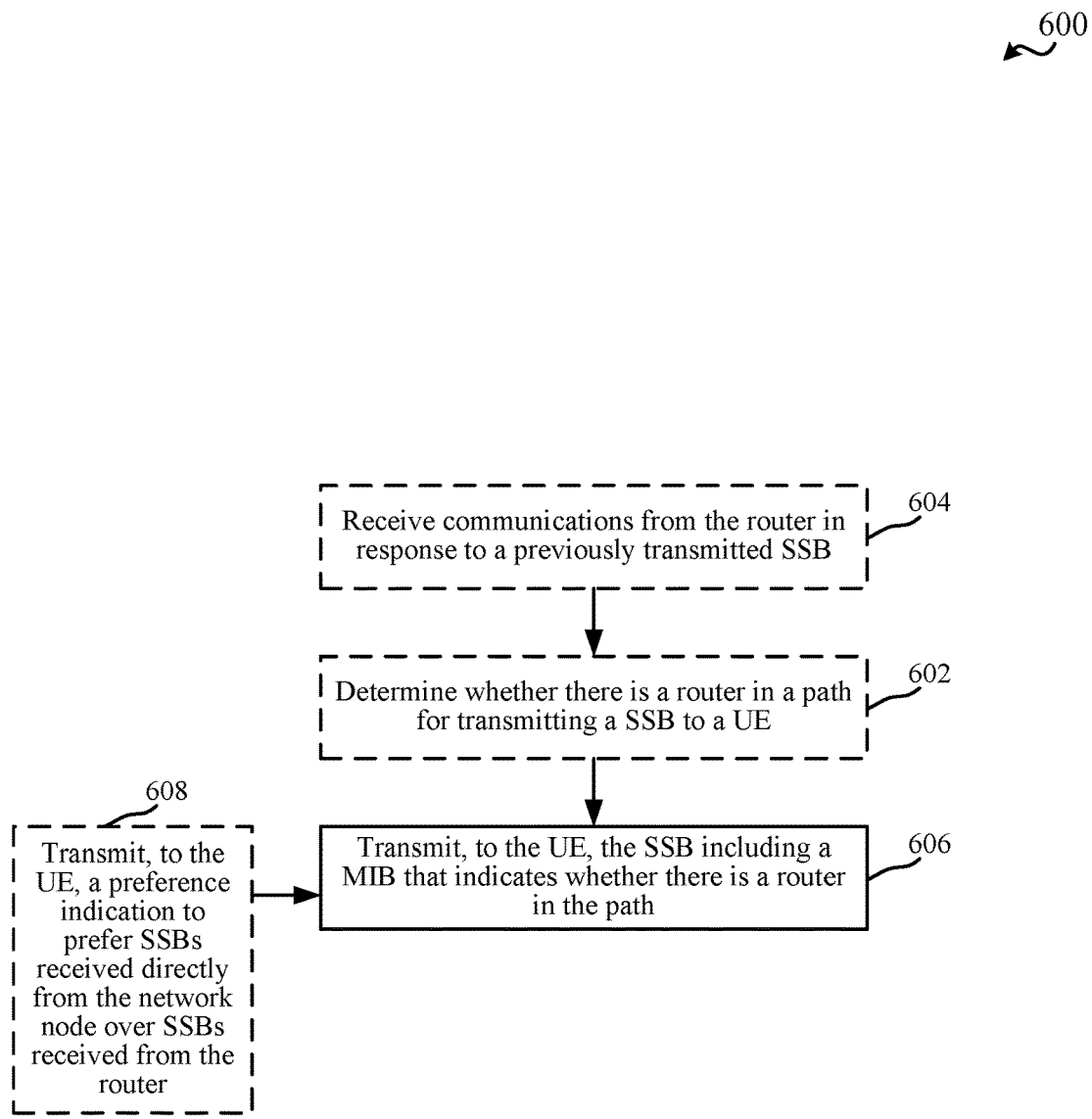
FIG. 6 is a flow chart illustrating an example of a method for indicating whether a SSB is transmitted directly from a network node or from a router in the path to the network node, in accordance with aspects described herein.

Turning now to FIGS. 3-7, aspects are depicted with reference to one or more components and one or more methods that may perform the actions or operations described herein, where aspects in dashed line may be optional. Although the operations described below in FIGS. 5-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for processing a SSB or a corresponding SIB based on whether the SSB is received directly from a network node or from a router in a path to the network node, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a path information component 352 for obtaining or determining path information related to a SSB indicating whether the SSB is received directly from a network node (e.g., base station 102, or gNB 180, or portion thereof, such as a portion of a disaggregated base station, etc.) or from a router within the path to the network node, and/or a signal processing component 354 for processing a signal, such as the SSB or corresponding SIB, based on whether the SSB is received direction from the network node or from a router in the path to the network node, in accordance with aspects described herein.

In an aspect, the processor(s) 312 may correspond to one or more of the processors described in connection with the UE in FIG. 7. Similarly, the memory 316 may correspond to the memory described in connection with the UE in FIG. 7.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for indicating whether a SSB is from the network node or is routed by a router in a path to the network node, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a router detecting component 452 for detecting whether there is a router within a path to a UE 104, in accordance with aspects described herein.

In an aspect, the processor(s) 412 may correspond to one or more of the processors described in connection with the base station in FIG. 7. Similarly, the memory 416 may correspond to the memory described in connection with the base station in FIG. 7.

In accordance with aspects described herein, an SSB can be used for initial cell detection and/or time/frequency correction utilizing the primary synchronization signal (PSS) and secondary synchronization signal (SSS) in the SSB. The SSB may also include a MIB, which can convey key information for cell access. An example format for a MIB, as defined in 5G NR, may include the following:

```
MIB ::= SEQUENCE {
    systemFrameNumber         BIT STRING (SIZE (6)),
    subCarrierSpacingCommon   ENUMERATED
                              {scs15or60, scs30or120},
    ssb-SubcarrierOffset      INTEGER (0..15),
    dmrs-TypeA-Position       ENUMERATED {pos2, pos3},
    pdcch-ConfigSIB1          INTEGER (0..255),
    cellBarred                ENUMERATED {barred, notBarred},
    intraFreqReselection      ENUMERATED {allowed, notAllowed},
    spare                     BIT STRING (SIZE (1))
}
```

In an example, a gNB can be aware of whether a given SSB it is sending is serving a router, such as a repeater. In the example of a repeater, the repeater can redirect the SSB to different spatial directions. As such, the gNB can indicate when the SSB is coming from the router. In one example, the spare bit (or other reserved bit) can be used for signaling whether there is a router/repeater involved in the downlink path or not. In another example, an additional field can be added to the MIB to indicate whether there is a router/repeater, which may also include a functionality of UEs to perform blind decoding of the MIB supporting this feature. In one example, aspects described herein may be beneficial for devices operating in sub-THz band, and as such, the additional UE functionality may acceptable as legacy UEs may not need to be supported.

FIG. 5 illustrates a flow chart of an example of a method 500 for processing a SSB or corresponding SIB based on whether the SSB is received directly from a network node or from a router in the path to the network node, in accordance with aspects described herein. FIG. 6 illustrates a flow chart of an example of a method 600 for indicating whether a SSB is transmitted directly from a network node or from a router in the path to the network node, in accordance with aspects described herein. In an example, a UE 104 can perform the functions described in method 500 using one or more of the components described in FIGS. 1 and 3. In an example, a base station 102 (e.g., a gNB, a monolithic base station, a portion of a disaggregated base station, etc.) can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In method 600, optionally at Block 602, it can be determined whether there is a router in a path for transmitting a SSB to a UE. In an aspect, router detecting component 452, e.g., in conjunction with processor(s) 412, memory 416, transceiver 402, BS communicating component 442, etc., can determine whether there is a router in the path for transmitting the SSB to the UE. For example, there may be a router in the path between the network node and the UE, where the router can re-route signals from the network node. For example, the router can be a repeater that amplifies and forwards the signals from the network node in one or more spatial directions. In another example, the router can be a femto cell or relay node that receives the signals from the network node and retransmits the signals in one or more spatial directions. In yet another example, the router can be a RIS that reflects the signals from the network node in a different spatial direction. In any case, router detecting component 452 may be able to detect whether there is a router in the path to the UE. This may be based on information that the network node receives from the router, from one or more other UEs, from a network node aware of deployment information, etc.

In method 600, optionally at Block 604, communications can be received from the router in response to a previously transmitted SSB. In an aspect, router detecting component 452, e.g., in conjunction with processor(s) 412, memory 416, transceiver 402, BS communicating component 442, etc., can receive communications from the router in response to the previously transmitted SSB. For example, the router can respond to the previously transmitted SSB to establish a connection with the network node or otherwise indicate presence of the router. In this regard, for example, router detecting component 452 can know that certain subsequent SSBs sent on a certain path or in a certain spatial direction are served to the router and may be received and forwarded by the router. As such, for example, the network node may indicate that these SSBs are forwarded by (or received by a UE from) a router and not the network node directly.

In method 600, at Block 606, the SSB including a MIB that indicates whether there is a router in the path can be transmitted to the UE. In an aspect, BS communicating component 442, e.g., in conjunction with processor(s) 412, memory 416, transceiver 402, etc., can transmit, to the UE (e.g., UE 104), the SSB including the MIB, where the MIB can indicate whether there is a router in the path to the network node. For example, the MIB can indicate whether there is a router in the path to the network node by using bits of a spare field in the MIB, as described above, or by including a newly defined field for the indication. For example, where there is a router in the path, the router can accordingly forward the SSB from the network node. In any case, the indication in the MIB can be set when the network node is aware of the router in the path to the UE 104, as described above.

In method 500, at Block 502, a SSB originated from a network node can be received. In an aspect, UE communicating component 342, e.g., in conjunction with processor(s) 312, memory 316, transceiver 302, etc., can receive the SSB originated from the network node. For example, though the SSB is originated from the network node (e.g., a base station 102, a gNB 180, a portion thereof, such as a portion of a disaggregated base station, etc.), it may be received by the UE 104 from a router in the path to the network node. As described above, in some examples, the SSB may include an indication (e.g., a value in a MIB within the SSB) indicating whether there is a router in the path to the network node for the given SSB.

In method 500, optionally at Block 504, it can be determined whether the SSB is received from the network node or from a router in a path from the network node. In an aspect, path information component 352, e.g., in conjunction with processor(s) 312, memory 316, transceiver 302, UE communicating component 342, etc., can determine whether the SSB is received from the network node (e.g., a base station 102, a gNB 180, a portion thereof, such as a portion of a disaggregated base station, etc.) or from the router in the path from the network node. For example, path information component 352 can verify whether the SSB is from the network node or router based on the path information in the SSB, as described above.

In method 500, at Block 506, the SSB or a corresponding SIB of the network node can be processed based on whether the SSB is received from the network node or from the router. In an aspect, signal processing component 354, e.g., in conjunction with processor(s) 312, memory 316, transceiver 302, UE communicating component 342, etc., can process the SSB or a corresponding SIB of the network node based on whether the SSB is received from the network node (directly) or from the router in the path to the network node. In an example, the MIB of the SSB can indicate corresponding SIBs that are transmitted after the SSB, and signal processing component 354 can process or utilize one or more of the corresponding SIBs based on whether the SSB is received directly from the network node or from the router in the path.

For example, signal processing component 354 can accordingly process the SSB or corresponding SIB based on the indication in the SSB (e.g., in the MIB of the SSB), as described above. In various examples described herein, signal processing component 354 can process the SSB or corresponding SIB differently where the SSB is received directly from the network node than where the SSB is received from the router. For example, some parameters may not be applicable or usable for situations where the SSB is received from the router. As such, in some examples, signal processing component 354 can determine not to process or utilize some values in the SSB or corresponding SIB when the SSB is received from the router in the path.

In an example, QCL information in the SSB or corresponding SIB may be corrupted by a repeater, and as such the UE 104 may not assume colocation information to establish a beam direction based on other beams in sub-THz or beams from a first frequency range (FR) (e.g., FR2) to a second FR (e.g., FR1). As such, in an example, in processing the SSB or corresponding SIB at Block 506, optionally at Block 508, quasi-colocation (QCL) information in the SSB or the corresponding SIB can be processed where the SSB is received from the network node, or optionally at Block 510, processing the QCL information in the SSB or the corresponding SIB can be refrained from where the SSB is received from the router. In an aspect, signal processing component 354, e.g., in conjunction with processor(s) 312, memory 316, transceiver 302, UE communicating component 342, etc., can process QCL information in the SSB or the corresponding SIB where the SSB is received from the network node, or can refrain from processing the QCL information in the SSB or the corresponding SIB where the SSB is received from the router. For example, signal processing component 354 can refrain from providing the QCL information to upper layers, refrain from reading the QCL information from the corresponding SIB or otherwise storing the information in memory 316, etc. where the SSB is received from the router.

In another example, a location of remaining minimum system information (RMSI) (e.g., SIB1) and/or other system information (OSI), as defined in 5G NR, may not apply or information inside the RMSI or OSI may need modification (e.g., to the cell reselection information) where the SSB or corresponding SIB (e.g., SIB1) is received from the repeater. As such, in an example, in processing the SSB or corresponding SIB at Block 506, optionally at Block 512, RMSI or OSI in the corresponding SIB can be processed where the SSB is received from the network node, or optionally at Block 514, processing or locating the RMSI or OSI in the corresponding SIB can be refrained from where the SSB is received from the router. In an aspect, signal processing component 354, e.g., in conjunction with processor(s) 312, memory 316, transceiver 302, UE communicating component 342, etc., can process the RMSI or OSI in the corresponding SIB where the SSB is received from the network node, or can refrain from processing or locating the RMSI or OSI in the corresponding SIB where the SSB is received from the router. For example, signal processing component 354 can refrain from reading the RMSI or OSI or the associated SIBs where the SSB is received from the router. In other examples, signal processing component 354 can refrain from providing the RMSI or OSI or the associated SIBs to upper layers or storing the associated information in memory 316, etc. where the SSB is received from the router.

In another example, other information in SIB may not be dependable for the UE 104 where the SSB or corresponding SIB is received from the router and not directly from the network node. One such example may include an indication of SSB periodicity (e.g., ServingCellConfigCommonSlB:: ssb-PeriodicityServingCell defined in 5G NR), as the router may divert the SSB to different spatial directions for difference occasion of the same SSB. As such, in an example, in processing the SSB or corresponding SIB at Block 506, optionally at Block 516, SSB periodicity for receiving one or more subsequent SSBs can be processed where the SSB is received from the network node, or optionally at Block 518, processing the SSB periodicity for receiving the one or more subsequent SSBs can be refrained from where the SSB is received from the router. In an aspect, signal processing component 354, e.g., in conjunction with processor(s) 312, memory 316, transceiver 302, UE communicating component 342, etc., can process the SSB periodicity for receiving one or more subsequent SSBs where the SSB is received from the network node, or can refrain from processing the SSB periodicity for receiving one or more subsequent SSBs where the SSB is received from the router. For example, where signal processing component 354 processes the SSB periodicity, UE communicating component 342 can receive a next SSB from the network node according to the SSB periodicity. IN another example, where signal processing component 354 determines to refrain from processing the SSB periodicity, signal processing component 354 can refrain from reading the value from SIB, refrain from providing the value to upper layers or storing the associated information in memory 316, etc. where the SSB is received from the router.

In one example, the UE 104 can receive both the SSB directly from the network node and also from the router in the path. In this example, in processing the SSB or corresponding SIB at Block 506, signal processing component 354 can prefer (and process) the SSB from the network node over the SSB from the router in the path, which can include signal processing component 354 only processing the SSB determined to be from the network node and refraining from processing the SSB determined to be from the router in the path. This can improve reliability of the SSB and the corresponding SIB and/or related information, as described above, and can also help to reduce load on the router, as the UE 104 can connect directly to the network node, instead of the router, based on the SSB. In one example, signal processing component 354 can determine to prefer the SSB from the network node as a default or based on receiving a preference indication.

Thus, in one example, in method 500, optionally at Block 520, a preference indication to prefer SSBs received directly from the network node over SSBs received from the router can be received from the network node. In an aspect, signal processing component 354, e.g., in conjunction with processor(s) 312, memory 316, transceiver 302, UE communicating component 342, etc., can receive, from the network node, the preference indication to prefer SSBs received directly from the network node over SSBs received from the router. In an example, signal processing component 354 can receive the indication in MIB or SIB signaling from the network node, from another network node, etc. Signal processing component 354 can accordingly prefer or prioritize SSBs received directly from the network node over those received via the router.

In one example, in method 600, optionally at Block 608, a preference indication to prefer SSBs received directly from the network node over SSBs received from the router can be transmitted to the UE. In an aspect, BS communicating component 442, e.g., in conjunction with processor(s) 412, memory 416, transceiver 402, etc., can transmit, to the UE (e.g., UE 104), the preference indication to prefer SSBs received directly from the network node over SSBs received from the router. For example, BS communicating component 442 can transmit the preference indication to the UE 104 in MIB or SIB signaling, and the UE 104 can use the preference indication to prioritize SSB received directly from the network node for processing and/or for establishing communication with the network node.

Figure 7:
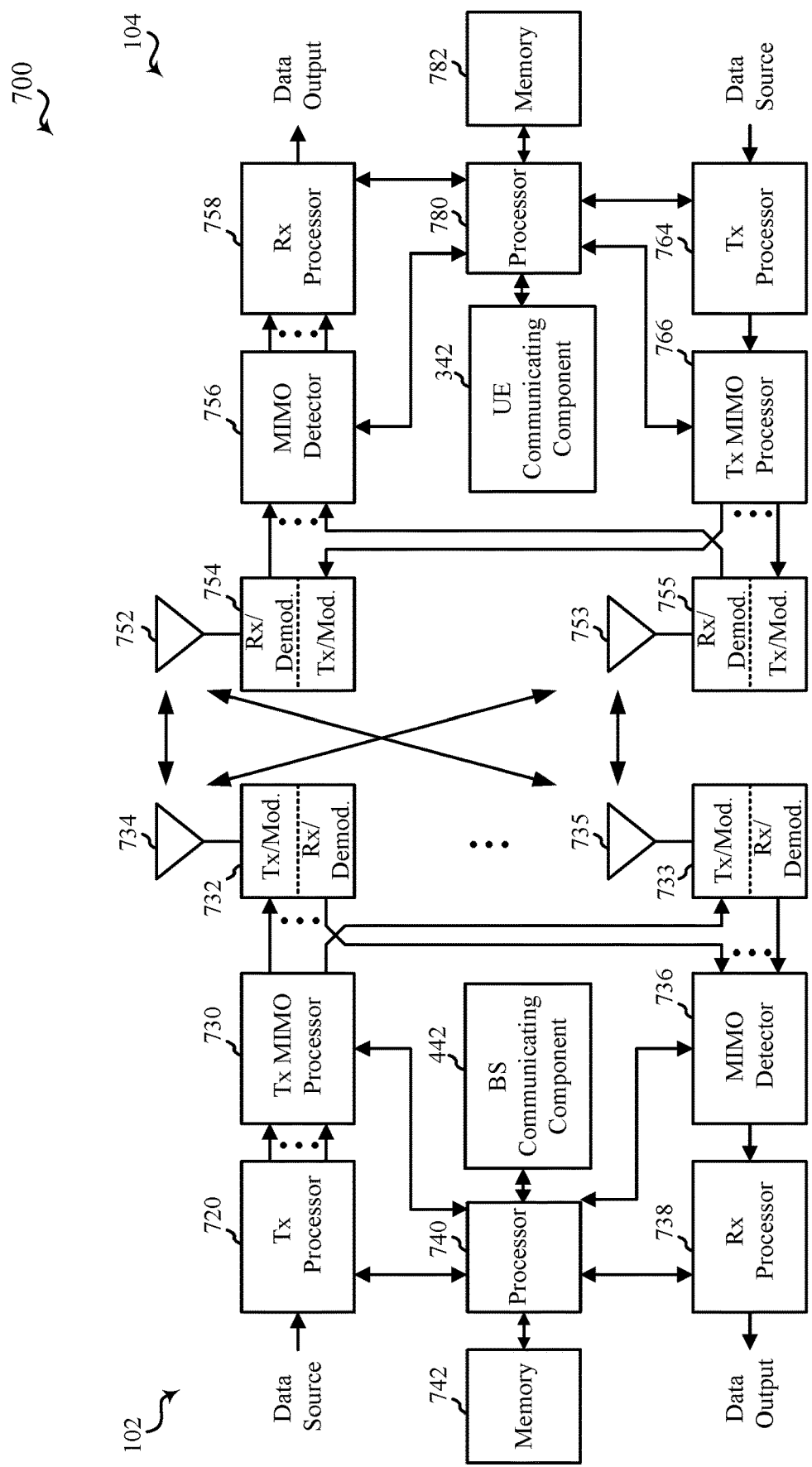
FIG. 7 is a block diagram illustrating an example of a multiple-input multiple-output (MIMO) communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 3. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a UE communicating component 342 (see e.g., FIGS. 1 and 3).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for single carrier-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication at a UE including receiving a SSB originated from a network node, determining whether the SSB is received from the network node or from a router in a path from the network node, and processing the SSB or a corresponding SIB of the network node based on whether the SSB is received from the network node or the router.

In Aspect 2, the method of Aspect 1 includes where a MIB in the SSB includes keying information for cell access including a parameter with a value indicating whether the router is in the path from the network node, where determining whether the SSB is received from the network node or from the router is based on the value.

In Aspect 3, the method of Aspect 2 includes where the parameter is a spare bit of the MIB that is defined in a wireless communication technology.

In Aspect 4, the method of any of Aspects 1 to 3 includes where processing the SSB or the corresponding SIB includes processing quasi-colocation information in the SSB or the corresponding SIB where the SSB is received from the network node.

In Aspect 5, the method of any of Aspects 1 to 4 includes where processing the SSB or the corresponding SIB includes refraining from processing the quasi-colocation information in the SSB or the corresponding SIB where the SSB is received from the router.

In Aspect 6, the method of any of Aspects 1 to 5 includes where processing the SSB or the corresponding SIB includes processing RMSI or OSI in the corresponding SIB where the SSB is received from the network node.

In Aspect 7, the method of any of Aspects 1 to 6 includes where processing the SSB or the corresponding SIB includes refraining from processing or locating the RMSI or the OSI in the corresponding SIB where the SSB is received from the router.

In Aspect 8, the method of any of Aspects 1 to 7 includes where processing the SSB or the corresponding SIB includes processing a SSB periodicity for receiving one or more subsequent SSBs where the SSB is received from the network node.

In Aspect 9, the method of any of Aspects 1 to 8 includes where processing the SSB or the corresponding SIB includes refraining from processing the SSB periodicity or from receiving the one or more subsequent SSBs where the SSB is received from the router.

In Aspect 10, the method of any of Aspects 1 to 9 includes where receiving the SSB includes receiving the SSB from the router, and further comprising receiving the SSB from the network node, where processing the SSB or the corresponding SIB is based on the SSB as received from the network node.

In Aspect 11, the method of Aspect 10 includes receiving, from the network node, a preference indication to prefer SSBs received directly from the network node over SSBs received from the router, where processing the SSB or the corresponding SIB based on the SSB as received from the network node is further based on the preference indication.

Aspect 12 is a method for wireless communications at a network node including detecting whether there is a router in a path for transmitting a SSB to a UE, and transmitting, to the UE, the SSB including a MIB that indicates whether there is the router in the path.

In Aspect 13, the method of Aspect 12 includes where the MIB indicates whether there is the router in the path using a parameter that is part of a spare bit of the MIB that is defined in a wireless communication technology.

In Aspect 14, the method of any of Aspects 12 or 13 includes where detecting whether there is the router in the path is based on receiving communications from the router in response to a previously transmitted SSB.

In Aspect 15, the method of any of Aspects 12 to 14 includes transmitting, to the UE, a preference indication to prefer SSBs received directly from the network node over SSBs received from the router.

Aspect 16 is an apparatus for wireless communication including a processor, memory coupled with the processor, and instructions stored in the memory and operable, when executed by the processor, to cause the apparatus to perform any of the methods of Aspects 1 to 15.

Aspect 17 is an apparatus for wireless communication including means for performing any of the methods of Aspects 1 to 15.

Aspect 18 is a computer-readable medium including code executable by one or more processors for wireless communications, the code including code for performing any of the methods of Aspects 1 to 15.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a processor;
   memory coupled with the processor; and
   instructions stored in the memory and operable, when executed by the processor, to cause the apparatus to:
   receive a synchronization signal block (SSB) originated from a network node; and
   process the SSB or a corresponding system information block (SIB) of the network node based on whether the SSB is received from the network node or from a router in a path from the network node.

2. The apparatus of claim 1, wherein a master information block (MIB) in the SSB includes keying information for cell access including a parameter with a value indicating whether the router is in the path from the network node, and wherein the instructions, when executed by the processor, cause the apparatus to determine whether the SSB is received from the network node or from the router is based on the value.

3. The apparatus of claim 2, wherein the parameter is a spare bit of the MIB that is defined in a wireless communication technology.

4. The apparatus of claim 1, wherein the instructions, when executed by the processor, cause the apparatus to process the SSB or the corresponding SIB at least in part by processing quasi-colocation information in the SSB or the corresponding SIB where the SSB is received from the network node.

5. The apparatus of claim 4, wherein the instructions, when executed by the processor, cause the apparatus to process the SSB or the corresponding SIB at least in part by refraining from processing the quasi-colocation information in the SSB or the corresponding SIB where the SSB is received from the router.

6. The apparatus of claim 1, wherein the instructions, when executed by the processor, cause the apparatus to process the SSB or the corresponding SIB at least in part by processing remaining minimum system information (RMSI) or other system information (OSI) in the corresponding SIB where the SSB is received from the network node.

7. The apparatus of claim 6, wherein the instructions, when executed by the processor, cause the apparatus to process the SSB or the corresponding SIB at least in part by refraining from processing or locating the RMSI or the OSI in the corresponding SIB where the SSB is received from the router.

8. The apparatus of claim 1, wherein the instructions, when executed by the processor, cause the apparatus to process the SSB or the corresponding SIB at least in part by processing a SSB periodicity for receiving one or more subsequent SSBs where the SSB is received from the network node.

9. The apparatus of claim 8, wherein the instructions, when executed by the processor, cause the apparatus to process the SSB or the corresponding SIB at least in part by refraining from processing the SSB periodicity or from receiving the one or more subsequent SSBs where the SSB is received from the router.

10. The apparatus of claim 1, wherein the instructions, when executed by the processor, cause the apparatus to receive the SSB from the router, and wherein the instructions, when executed by the processor, cause the apparatus to receive the SSB from the network node, wherein the instructions, when executed by the processor, cause the apparatus to process the SSB or the corresponding SIB based on the SSB as received from the network node.

11. The apparatus of claim 10, wherein the instructions, when executed by the processor, cause the apparatus to receive, from the network node, a preference indication to prefer SSBs received directly from the network node over SSBs received from the router, wherein the instructions, when executed by the processor, cause the apparatus to process the SSB or the corresponding SIB based on the SSB as received from the network node further based on the preference indication.

12. An apparatus for wireless communication, comprising:
a processor;
memory coupled with the processor; and
instructions stored in the memory and operable, when executed by the processor, to cause the apparatus to:
detect whether there is a router in a path for transmitting a synchronization signal block (SSB) to a user equipment (UE); and
transmit, to the UE, the SSB including a master information block (MIB) that indicates whether there is the router in the path.

13. The apparatus of claim 12, wherein the MIB indicates whether there is the router in the path using a parameter that is part of a spare bit of the MIB that is defined in a wireless communication technology.

14. The apparatus of claim 12, wherein the instructions, when executed by the processor, cause the apparatus to detect whether there is the router in the path based on receiving communications from the router in response to a previously transmitted SSB.

15. The apparatus of claim 12, wherein the instructions, when executed by the processor, cause the apparatus to transmit, to the UE, a preference indication to prefer SSBs received directly from the apparatus over SSBs received from the router.

16. A method for wireless communication at a user equipment (UE), comprising:
receiving a synchronization signal block (SSB) originated from a network node; and
processing the SSB or a corresponding system information block (SIB) of the network node based on whether the SSB is received from the network node or from a router in a path from the network node.

17. The method of claim 16, wherein a master information block (MIB) in the SSB includes keying information for cell access including a parameter with a value indicating whether the router is in the path from the network node, and further comprising determining whether the SSB is received from the network node or from the router is based on the value.

18. The method of claim 17, wherein the parameter is a spare bit of the MIB that is defined in a wireless communication technology.

19. The method of claim 16, wherein processing the SSB or the corresponding SIB includes processing quasi-colocation information in the SSB or the corresponding SIB where the SSB is received from the network node.

20. The method of claim 19, wherein processing the SSB or the corresponding SIB includes refraining from processing the quasi-colocation information in the SSB or the corresponding SIB where the SSB is received from the router.

21. The method of claim 16, wherein processing the SSB or the corresponding SIB includes processing remaining minimum system information (RMSI) or other system information (OSI) in the corresponding SIB where the SSB is received from the network node.

22. The method of claim 21, wherein processing the SSB or the corresponding SIB includes refraining from processing or locating the RMSI or the OSI in the corresponding SIB where the SSB is received from the router.

23. The method of claim 16, wherein processing the SSB or the corresponding SIB includes processing a SSB periodicity for receiving one or more subsequent SSBs where the SSB is received from the network node.

24. The method of claim 23, wherein processing the SSB or the corresponding SIB includes refraining from processing the SSB periodicity or from receiving the one or more subsequent SSBs where the SSB is received from the router.

25. The method of claim 16, wherein receiving the SSB includes receiving the SSB from the router, and further comprising receiving the SSB from the network node, wherein processing the SSB or the corresponding SIB is based on the SSB as received from the network node.

26. The method of claim 25, further comprising receiving, from the network node, a preference indication to prefer SSBs received directly from the network node over SSBs received from the router, wherein processing the SSB or the corresponding SIB based on the SSB as received from the network node is further based on the preference indication.

27. A method for wireless communications at a network node, comprising:

detecting whether there is a router in a path for transmitting a synchronization signal block (SSB) to a user equipment (UE); and transmitting, to the UE, the SSB including a master information block (MIB) that indicates whether there is the router in the path.

28. The method of claim 27, wherein the MIB indicates whether there is the router in the path using a parameter that is part of a spare bit of the MIB that is defined in a wireless communication technology.

29. The method of claim 27, wherein detecting whether there is the router in the path is based on receiving communications from the router in response to a previously transmitted SSB.

30. The method of claim 27, further comprising transmitting, to the UE, a preference indication to prefer SSBs received directly from the network node over SSBs received from the router.

* * * * *